INVENTORS
Robert Gross
Louis Jacobson
BY *Thorne & Hall*
ATTORNEYS

United States Patent Office 3,052,159
Patented Sept. 4, 1962

3,052,159
REINFORCED AND ORNAMENTAL SPECTACLE
HINGE CONNECTIONS
Robert Gross, 21 Coolidge Place, Hackensack, N.J., and
Louis Jacobson, 23 W. 73rd St., New York, N.Y.
Filed Dec. 31, 1959, Ser. No. 863,269
7 Claims. (Cl. 88—41)

The present invention relates to hinge connections for use in spectacle structures, and is more particularly concerned with an improved hinge assembly of metallic construction adapted to be employed with spectacle frames comprising essentially plastic base materials; and adapted to obviate various disadvantages which have been characteristic of hinged plastic spectacle frames heretofore.

As is well known at the present time, spectacle frames may comprise plastic materials having, if desired, metallic reinforcement members embedded therein; and such spectacle frames conventionally comprise a spectacle front adapted to receive and retain lens members, and cooperating with a pair of essentially plastic temples hingedly attached to the spectacle front adjacent opposing ends thereof. When the temples and spectacle front each comprise plastic materials, it has been conventional heretofore to attach metallic hinge members directly to plastic portions of the frame; and the attachment normally comprises pins extending through a portion of the hinge member and thence through the plastic front and temples of the spectacles.

These typical constructions have been found to exhibit a number of disadvantages. In particular, it has been found that the metallic hinges, fastened directly into the plastic members comprising the spectacle front and temples, tend to loosen after limited periods of usage. This loosening effect is further complicated by the fact that no protective surfaces are ordinarily provided at the points of abutment between the temple members and the adjacent end of the spectacle front, whereby temple lever action tends to cause a wearing of the plastic against plastic surfaces comprising adjacent portions of the spectacle front and temples. In addition, it has been found that the form of attachments suggested heretofore, and the relative flexibility of plastic materials ordinarily employed, results in a distortion and/or bending of the connection areas adjacent the spectacle front and temples.

All of these factors, i.e. loosening of the hinges, wearing of plastic members, and bending of the spectacle front and temple connecting areas, makes it relatively difficult to maintain a proper constant adjustment of the frame in plastic frame spectacles. As a result, the life of plastic frame spectacles has been found to be considerably less than might be desired, and more frequent adjustments of the frame have been found necessary than is desirable, all due primarily to the form of hinge connections which are conventionally employed.

The present invention is concerned with a novel form of hinge mounting and connection structure which serves to obviate all of the foregoing difficulties. The structure to be described hereinafter employs elements so arranged as to firmly mount hinge portions in place, thereby to prevent loosening of hinges; and the structure also reinforces the connecting areas of temples and spectacle front and simultaneously provides bearing surfaces of metal upon metal rather than plastic upon plastic in the connecting areas of the spectacle front and temples, thereby to prevent any significant wear in these connecting areas due to temple lever action. In addition, as will become apparent from the subsequent discussion, all of these mechanical advantages are achieved by a structure which enhances the ornametal appearance of the spectacle frames and which may in fact be considered as a unique form and mounting of ornamentation on the frames in the connecting areas between the front and temples thereof.

It is accordingly an object of the present invention to provide an improved hinge mounting arrangement for use in spectacles.

Another object of the present invention resides in the provision of an improved metallic hinge structure for use with essentially plastic spectacle frames.

Still another object of the present invention resides in the provision of a spectacle frame of essentially plastic material which is adapted to maintain a proper constant adjustment for longer periods of time than has been possible heretofore.

A still further object of the present invention resides in the provision of a spectacle frame having considerably higher stability and rigidity between the frame and temple connecting areas than has been possible heretofore.

A further object of the present invention resides in the provision of a hinge and ornamentation structure adapted to prevent flexing and distortion of plastic spectacle frames in the region of the spectacle front and temples, and further adapted to reinforce these areas of the spectacle frame while at the same time giving a unique ornamental appearance to the overall frame.

Still another object of the present invention resides in the provision of a hinge structure for plastic spectacle frames adapted to present metal upon metal bearing surfaces as the temple is moved by lever action relative to the spectacle front thereby to decrease wear and tear in the areas of abutment between said temples and front.

Still another object of the present invention resides in a novel plastic spectacle frame having portions thereof encased in metal for reinforcement purposes.

A further object of the present invention resides in the provision of a hinge structure for use with plastic spectacle frames which will not loosen from the frame even under conditions of extended use.

A still further object of the present invention resides in the provision of a novel ornamentation structure for use with spectacle frames.

In providing for the foregoing objects and advantages, the present invention contemplates the provision of a hinge structure utilizing pairs of metallic encasing members adapted to be mounted respectively at the ends of a spectacle front and on the adjacent portions of temples to be attached to said front. These encasing members are preferably of polished or other ornamental configuration and extend over a fairly appreciable area of the spectacle front ends as well as the temple ends, thereby to reinforce these areas of the spectacle frame and prevent any significant flexing thereof. Each of the metallic encasing members is further provided with a recessed cavity; and unitary hinge members are adapted to have opposed portions thereof received by these cavities in said encasing members. The arrangement is such, as will be described, that the portions of the hinge members entering these cavities bear metal upon metal, whereby no loosening of the hinges can occur due to the wearing of a plastic spectacle portion relatives to a metallic hinge portion. Moreover, the encasing members and their associated hinge portions are so arranged with respect to one another that bearing surfaces of metal are provided in the regions of abutment between the spectacle front and temple members when the temples are in open position, thereby to prevent changes in adjustment of the frame due to wearing of plastic upon plastic. All of these advantages are, moreover, achieved by a structure which is highly decorative in appearance and which lends a novel ornamental aspect to the overall frame.

The foregoing objects, construction and operation of the present invention will become more readily apparent from the following description and accompanying drawings, in which.

Figure 1:
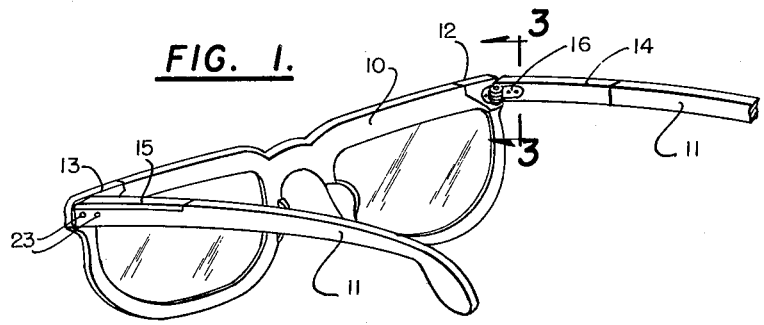
FIGURE 1 is a perspective view of a pair of spectacles having the invention thereon.

Referring now to the several figures, like numerals of which refer to like parts throughout, it will be seen that a pair of spectacles constructed in accordance with the present invention may comprise a frame which includes a plastic front member 10 and a pair of temples 11. The ends of the plastic front 10 are at least partially encased within a pair of ornamental metallic members 12 and 13, while the adjacent ends of the temples 11 are further at least partially encased within a pair of ornamental metallic encasing members 14 and 15. A metallic hinge 16 is mounted between the members 12 and 14, and a similiar such hinge is mounted between the elements 13 and 15.

Figure 2:
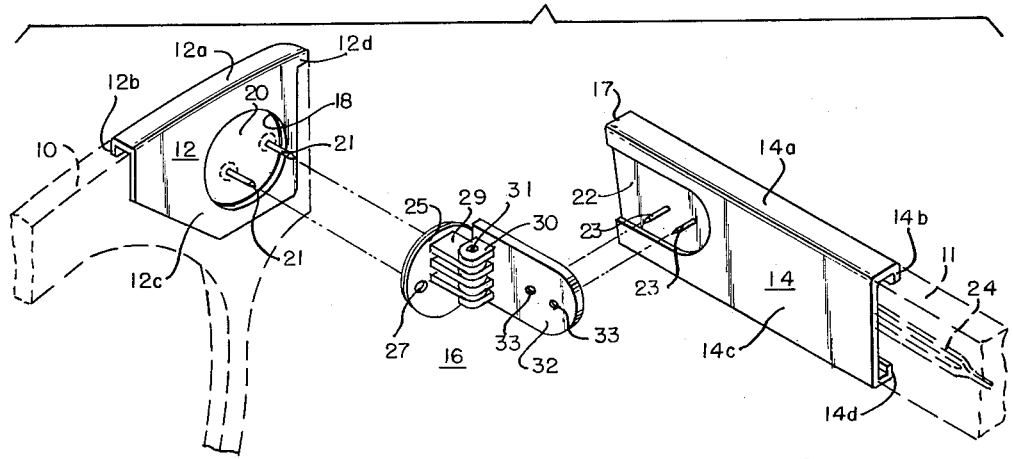
FIGURE 2 is an exploded enlarged representation of the several elements comprising the present invention.
Figure 3:
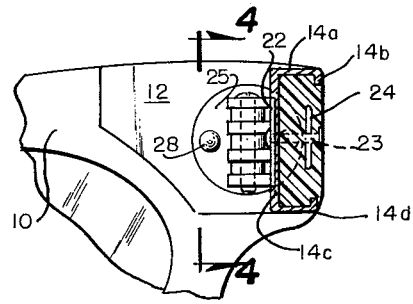
FIGURE 3 is a detail view in partial section, taken on line 3—3 of FIGURE 1.

The ornamental reinforcing and hinge mounting section 12 (or, of course, 13) is best shown in FIGURES 2 and 3 and comprises a metallic member having a portion 12a extending over the top of the spectacle front adjacent the end thereof, and a depending portion 12b extending downwardly along the front edge of the spectacle front adjacent the end thereof. Member 12 further includes a fairly large reinforcing plates 12c extending over a substantial area along the rear surface of the spectacle front; and section 12c includes a protrusion 12d extending to the outermost edge of the spectacle front and integrally joined to the downward extension 12b mentioned previously. The extension 12b thus acts as a retaining shoulder which extends along the front edge of the spectacle frame 10 and completely around the outermost edge thereof, becoming, on the rear surface of the spectacle frame, protrusion 12d which is, of course, an integral portion of the plate 12c. As a result, the uppermost portion of member 12 completely encases the upper edge and end of the spectacle front thereby giving substantial rigidity to this portion of the spectacle frame; and this rigidity and stability is continued over a fairly large area of the spectacle front end by reason of the large plate 12c.

Portion 12d, mentioned previously, also acts as a bearing surface along the rear of the spectacle front adapted to engage a portion of metallic reinforcement member 14 on the adjacent temple 11, as will be described, thereby to inhibit wear in the connecting areas of the temple front and temple, as the temple is moved in accordance with customary lever action. The portions 12a through 12d inclusive of the reinforcement member 12 are preferably embedded into the plastic material comprising front 10 so that the adjacent surfaces of the member 12 and spectacle front 10 are flush with one another.

The reinforcement member 14 associated with temple 11 also includes a portion 14a extending over the upper edge of the temple, and a downwardly extending portion 14b extending over the outer upper edge of temple 11. Member 14 further includes a metallic surface 14c extending across the entire inner surface of the temple 11 and formed into an upwardly extending projection 14d which is preferably embedded directly into the lower edge of the plastic temple 11. This arrangement of the several parts of member 14, and the embedded relation of these several parts, is best illustrated in FIGURE 3. The portion 14c, in addition to extending over the entire inner surface of the temple 11, also extends rearwardly for an appreciable distance, e.g. one inch from the frontmost edge 17 of the temple 11; and as a result, the portion of temple 11 which is adapted to connect to the adjacent portion of front 10 is reinforced so as to prevent any significant flexure or distortion thereof. It will be understood, of course, that member 15 is constructed and arranged in a manner analogous to member 14.

Figure 4:
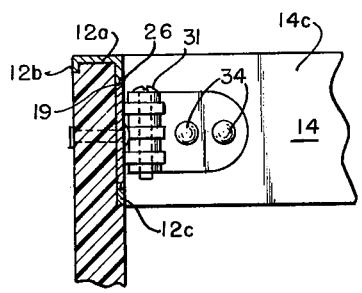
FIGURE 4 is a detail view in partial section taken on line 4—4 of FIGURE 3.

For purposes of receiving the hinge 16, to be described hereinafter, the rear plate 12c of the front reinforcement section 12 is provided with a generally circular aperture 18. Aperture 18 defines an internal shoulder 19 (see FIGURE 4 especially), against which a portion of the hinge 16 bears; whereby a metal to metal contact between the hinge and reinforcement section 12 can be effected. The major area of aperture 18 opens into a plastic portion 20 of frame 10; and a pair of pins 21 extend through this portion 20 of frame 10 for attachment to the hinge 16 as will be described hereinafter.

Reinforcement section 14 also includes a recessed portion 22 along the inner surface thereof; and recess 22 is formed entirely of metal whereby no portion of the plastic temple 11 is exposed in the region of recess 22. It will be appreciated, of course, that such a metal-bottomed construction can also be employed in conjunction with front reinforcement plate 12c; or that in the alternative, a shoulder and flange arrangement of the type employed in section 12c can be employed with section 14 in the region of recess 22. The essential consideration in each case is that the reinforcement section and the abutting hinge sections, to be described, bear metal upon metal when assembled, thereby to inhibit wear between abutting metallic and plastic parts.

In the particular arrangement shown in regard to temple 11, a pair of further pins 23 are caused to extend from the outer surface of temple 11 (see FIGURE 3) through the plastic material of the temple and then through the metal wall comprising the bottom of recess 22 in reinforcement section 14; and these pins 23 are designed for attachment to a further portion of hinge 16, as will also be described. Recessed metallic portion 22 is preferably formed, of course, with a pair of apertures designed to receive the pins 23; and for further rigidity, the pins 23 may be caused to pass directly through the metallic reinforcement 24 which is normally provided on the interior of plastic temples.

Hinge 16 comprises a front hinge plate 25 of generally circular configuration (or of any other configuration complementary to the actual configuration of aperture 18); and said front hinge plate 25 is provided with an annular flange 26 (see FIGURE 4) adapted to abut upon the shoulder 19 of recessed aperture 18. Front hinge plate 25 is also provided with a pair of apertures such as 27 adapted to receive the two pins 21 respectively whereby hinge plate 25 may have the flange 26 thereof forcibly held against the shoulder 19 of aperture 18 by appropriate distortion of pins 21 to provide enlarged heads such as 28. The inner surface of hinge plate 25 has a plurality of protrusions 29 extending rearwardly in substantially parallel relation to one another, and these protrusions are interleaved with a series of further protrusions 30, and held in place with respect to said protrusions 30 by means of a screw 31 to provide a hinge structure of the type customarily employed in spectacles.

Protrusions 30 are further attached to an elongated side hinge plate 32 of oblong configuration (or of any other appropriate configuration which is complementary to the configuration of recess 22). Side plate 32 is also provided with a pair of apertures 33 adapted to receive the pins 23, whereby metallic side plate 32 may be maintained in forcible contact with metal recess portion 22, through an appropriate enlargement of the inner ends of pins 23 to form enlarged heads such as 34.

It will be noted that, when completely assembled, the hinge structure is of unitary configuration. Front hinge plate 25 includes metallic portions which bear directly upon complementary metallic portions of front reinforcement member 12; and, similarly, metallic side hinge plate 32 bears upon metallic portions of side reinforcement member 14. In addition, the metallic top portion 14a of the side reinforcement member 14 extends completely to the front of temple 11 in such position that, when the temple is opened, it bears upon protrusion 12d of front reinforcement section 12; and accordingly, bearing surfaces of metal are provided in the regions of abutment between the temple and front of the spectacles, thereby to prevent misadjustment of the spectacle frame due to the wearing of plastic upon plastic. The structure, moreover, reinforces the corner areas of the frame to prevent any misadjustment of the frame due to distortion or flexure of these parts; and provides a rigid hinge mount which cannot loosen even under conditions of extended use.

It should be noted that the arrangement described is highly ornamental. The several parts of the hinge mount can be made of a highly polished metal which contrasts in a striking manner with the usual plastic materials employed for the remainder of the frame. When viewed from the top, the spectacles thus have metallic polished sections extending from the ends of the spectacle front around and onto the temples; and the depending flanges 12b and 14b of the front and side reinforcement sections also present an unbroken line of ornamentation extending around the corners of the frame. The ornamental aspect of the metallic inserts may be varied as desired by employing different shapes for the front and side sections of the frame; and indeed, various materials of appropriate structural rigidity, having various different finishes, may be selected as desired, to give different ornamental aspects to the overall structure. It should moreover be noted that the reinforcement members, providing the foregoing features of ornamentation, are embedded into the plastic frame material whereby they form a unitary portion of the frame and cannot become detached or lost even under conditions of extended use.

While I have thus described a preferred embodiment of my invention, many variations will be suggested to those skilled in the art; and certain such variations have already been described. It will be appreciated that other variations are possible. Thus, when the ornamental aspects of the invention alone are desired, appropriate plate members can be attached to the frame in the regions described, and in the manners described, without requiring that these frame members cooperate directly with the hinge portions. By far the best embodiment of the invention, however, employs a unitary ornamentation and hinge structure wherein the ornamentation acts not only to enhance the appearance of the spectacles, but also serves to reinforce the spectacles, provide metallic bearing surfaces, and mount the hinges, all as described.

Having thus described our invention, we claim:

1. A plastic spectacle comprising a plastic front member and a pair of plastic temples hingedly attached to said front member at the corners thereof, reinforcement means for preventing flexure of said front member and temples in the regions of said hinged attachments, said reinforcement means comprising a first pair of elongated substantially channel shaped metallic members extending along the inner sides of and at least partially encasing the upper and lower edges of said pair of temples adjacent said hinged attachments, said first pair of members including portions embedded into the plastic material comprising said temples, and a second pair of metallic members at least partially encasing edges of said plastic front at the corners thereof respectively adjacent said hinged attachments, said second pair of metallic members including metallic plate portions extending along the rear surface of said plastic front and including integral flange portions extending over both the upper and outer edges of said plastic front, said second pair of metallic members including portions adapted to abut upon portions of said first pair of metallic members thereby to provide wear resisting metallic bearing surfaces between said plastic front member and plastic temples.

2. The combination of claim 1 including hinges extending between said temples and front member, wherein at least one of said first and second pairs of metallic members including a recessed cavity defining an internal metallic shoulder, said hinges including a hinge plate complementary in shape to said recessed cavity and including a flange bearing upon said metallic shoulder, and fastening means for holding said hinge plate in said cavity with said shoulder and flange in engagement with one another.

3. The combination of claim 1 wherein at least one of said pairs of metallic members includes a metal-bottomed recess, and hinges extending between said temples and front member, said hinges each including a hinge plate seated within one of said recesses in engagement with the metal bottom thereof.

4. A spectacle frame comprising a front member and a pair of temple members, a first pair of metallic members extending over rear surfaces of said front member adjacent the outer corners respectively of said front member, each of said first pair of metallic members including a recessed aperture, a second pair of metallic members extending respectively over inner surfaces of both said temple members, each of said second pair of metallic members also including a recessed aperture, and a pair of metallic hinge members extending between said first and second metallic members to hingedly connect said temple members to said front member corners, each of said metallic hinge members including a pair of metallic hinge plates complementary in shape, respectively, and seated within one of said first metallic member apertures and one of said second metallic member apertures with said metallic hinge plates being in engagement with metallic portions of both said first and second metallic members.

5. A spectacle front and temple member hinge connection comprising a plate attached to a rear surface of said front member adjacent an outer corner of said front member, said plate including a recessed cavity defining an internal shoulder, a hinge extending between said front and temple members, said hinge including a hinge plate complementary in shape to said recessed cavity and having a flange bearing upon said shoulder, and fastening means passing from said hinge plate through said cavity for holding said hinge plate in said cavity with said shoulder and flange in engagement with one another.

6. In a plastic spectacle of the type comprising a plastic front member and a pair of plastic temples hingedly attached to said front member at the corners thereof, the improvement which comprises reinforcement means for preventing flexure of said front member and temples in the regions of said hinged attachments, said reinforcement means including first elongated substantially channel shaped metallic members adapted to extend along sides of and to overlie and at least partially encase at least one edge of each of said pair of temples adjacent said hinged attachments, said first members including portions adapted to be embedded into the plastic material comprising said temples, and second metallic members adapted to overlie and to at least partially encase edges of said plastic front at the corners thereof respectively adjacent said hinged attachments, said second metallic members including portions adapted to extend along the rear surface of said plastic front and including integral flange portions adapted to extend over at least one edge of said plastic front adjacent to said surface, said second metallic members including portions adapted to abut upon portions of said first metallic members thereby to provide wear resisting metallic bearing surfaces between said plastic front member and plastic temples.

7. The structures of claim 6 including hinges adapted to extend between said temples and front member, at least one of said first and second metallic members including a recessed cavity, said hinges including a hinge plate complementary in shape to, and adapted to be seated in, said recessed cavity.

References Cited in the file of this patent

UNITED STATES PATENTS

| 2,629,196 | Splaine | Feb. 24, 1953 |
| 2,634,655 | Knowles et al. | Apr. 14, 1953 |
| 2,745,314 | Rabb | May 15, 1956 |

FOREIGN PATENTS

| 538,582 | Canada | Mar. 26, 1957 |
| 548,599 | Italy | Sept. 26, 1956 |
| 753,819 | Great Britain | Aug. 1, 1956 |